(12) United States Patent
    Gorecki, Jr.

(10) Patent No.: US 8,687,780 B2
(45) Date of Patent: Apr. 1, 2014

(54) COMMUNICATION SIGNAL DISTRIBUTION UNIT AND METHODS

(75) Inventor: Donald W. Gorecki, Jr., Elmhurst, IL (US)

(73) Assignee: Donald W. Gorecki, Jr., Elmhurst, IL (US)

( * ) Notice: Subject to any disclaimer, the term of this patent is extended or adjusted under 35 U.S.C. 154(b) by 0 days.

(21) Appl. No.: 13/432,607

(22) Filed: Mar. 28, 2012

(65) Prior Publication Data

US 2012/0250831 A1    Oct. 4, 2012

Related U.S. Application Data

(60) Provisional application No. 61/468,318, filed on Mar. 28, 2011.

(51) Int. Cl.
    *H04M 11/00* (2006.01)
(52) U.S. Cl.
    USPC ........................................ 379/93.01; 340/576
(58) Field of Classification Search
    USPC .................................................. 379/37, 93.01
    See application file for complete search history.

(56) References Cited

U.S. PATENT DOCUMENTS

| | | | |
|---|---|---|---|
| 5,168,372 A | 12/1992 | Sweetser | |
| 5,382,983 A | 1/1995 | Kwoh et al. | |
| 5,550,575 A | 8/1996 | West et al. | |
| 5,894,331 A | 4/1999 | Yang | |
| 6,426,702 B1 * | 7/2002 | Young et al. | 340/576 |
| 6,426,705 B1 * | 7/2002 | Wischoeffer | 340/12.27 |
| 6,477,354 B1 * | 11/2002 | Roberts et al. | 455/7 |
| 8,090,480 B2 * | 1/2012 | Brumfield et al. | 340/539.14 |
| 2008/0108249 A1 * | 5/2008 | Carman | 439/535 |

* cited by examiner

*Primary Examiner* — Maria El-Zoobi
(74) *Attorney, Agent, or Firm* — Cook Alex Ltd.

(57) ABSTRACT

A communication signal distribution unit includes a plurality of input ports for receiving incoming communication signals, a plurality of outlet ports for providing communication signals to electronic devices, a display for viewing information; and a set of keys for selecting one of the outlet ports, for entering a time to disable the communication signal provided by the selected output port, and for entering a time to re-enable provision of the communication signal at the selected output port. A 911 lock permits emergency calls through a disabled port. Programming methods are included.

8 Claims, 4 Drawing Sheets

Green Status Reporting 400

| 402 Date | 404 Time | 406 Device User Device | 408 Call Number | 410 ID of contact | 412 Duration |
|---|---|---|---|---|---|
| 2-28-11 | 12:21am | Dad | 555-5555 | pc | 2.5 hrs |

Could be Excel, Word or other print out.

911 Release/Buffering 500

310

911 Release lock, by buffering or just unlocks tone idicator

COMMUNICATION SIGNAL DISTRIBUTION UNIT AND METHODS

CROSS-REFERENCE TO RELATED PATENT APPLICATION

This non-provisional patent application claims the benefit of U.S. Provisional Patent Application Ser. No. 61/468,318, filed Mar. 28, 2011.

FIELD OF THE INVENTION

The present invention relates generally to methods and apparatus for controlling communication signal distribution including television signals, computer/internet signals and telephone signals, such as in homes or in other types of buildings.

BACKGROUND OF THE INVENTION

Many children have televisions (TVs), computers, telephones and/or other electronic devices which receive communication signals in their rooms. Many families have established or predefined evening times after which all electronics and lights are to be turned off in the children's rooms.

Nevertheless, children will, on some occasions, turn on the electronic devices after the parents are in bed. Of course, many parents have opinions that certain later evening TV shows may be inappropriate for children.

There are other prior art devices which monitor TV, phone and/or internet usage. However, they have shortcomings. For example, the apparatus disclosed in U.S. Pat. No. 5,168,372 shuts off an RF signal to only a single TV and, like a cable box or a TV set-top box, the apparatus for controlling the signal is located adjacent to the TV.

A general object of the present invention is to therefore provide a device which assists parents in censoring when and what children watch while their parents are asleep or not home, particularly for multiple rooms and for multiple types of electronic devices.

Another object of the present invention is to provide methods of censoring when and what children watch while their parents are asleep or not home, particularly for multiple rooms and for multiple types of electronic devices.

SUMMARY OF THE INVENTION

The present invention is directed to a communication signal distribution unit for controlling the distribution of information signals, such as television signals, computer/internet signals and telephone signals through out a building, such as a home, which overcomes the disadvantages and limitations discussed above. This distribution unit may constitute a small device which is mounted to a wall or the like with screws, bolts, DIN rail, or other types of suitable fasteners. For example, the unit may be mounted in a basement, utility room, electronic closet or other suitable location. The unit has keys for programming desired parameters; such that a plurality of outlet ports may be individually programmed to disable certain output ports at predetermined programmed times. Each outlet port may be identified as controlling electronic communication signals to a particular room, such as to a particular child's room. Preferably, the programming of the unit may also, or alternatively, be accomplished with a remote control.

The present invention also relates to a single wall output port/outlet version of the unit. However, the unit may have multiple input and output ports with more capabilities or functions. A data processor, disposed in the unit, may have a memory backup battery or a memory card or chip for saving programmed parameters in case of an electrical power failure. For example, the unit may have an internal flash memory such that programmed parameters are not lost upon a power failure.

A communication signal distribution unit includes a plurality of input ports for receiving a plurality of incoming communication signals, with each of the plurality of input ports receiving one of the plurality of incoming communication signals, a plurality of outlet ports, each of the plurality of outlet ports for providing a communication signal to an electronic device, a display for viewing information, and a set of keys for selecting one of the outlet ports, for entering a time to disable the communication signal provided at the selected output port, for entering a time to re-enable provision of the communication signal at the selected output port.

The plurality of input ports may be configured to receive a coaxial cable to provide a cable television signal, a digital subscriber line (DSL) cable to provide Internet service, and a telephone line to provide landline telephone service.

An antenna may be used to provide a wireless communication signal to at least one of the electronic devices. The electronic devices include televisions, computers and telephones. A set of keys disposed on the unit include a set of navigation keys and a numerical keypad. A release lock enables a telephone call to a 911 number or to another emergency number through any disabled output port. The unit generates a status report indicating usage of a selected one of the plurality of output ports. A remote sensor may be used to receive programming signals from a remote control. A USB port is provided for connectivity of a computer to the communication signal distribution unit.

A method of programming a communication signal distribution unit at one of a plurality of output ports which provide communication signals includes the steps of selecting one of a plurality of output ports, entering a time of the day for disabling the selected output port, and entering a time of the day for re-enabling the selected output port. An additional method includes the steps of receiving programming steps from a remote programming device at a remote sensor and using the received programming steps to program the unit.

BRIEF DESCRIPTION OF THE DRAWINGS

The invention, together with its objects and the advantages thereof, may best be understood by reference to the following description taken in conjunction with the accompanying drawings, in which like reference numerals identify like elements in the figures, and in which.

DESCRIPTION OF THE PREFERRED EMBODIMENTS

It will be understood that the present invention may be embodied in other specific forms without departing from the spirit thereof. The present examples and embodiments, therefore, are to be considered in all respects as illustrative and not restrictive, and the invention is not to be limited to the details presented herein.

Figure 1:
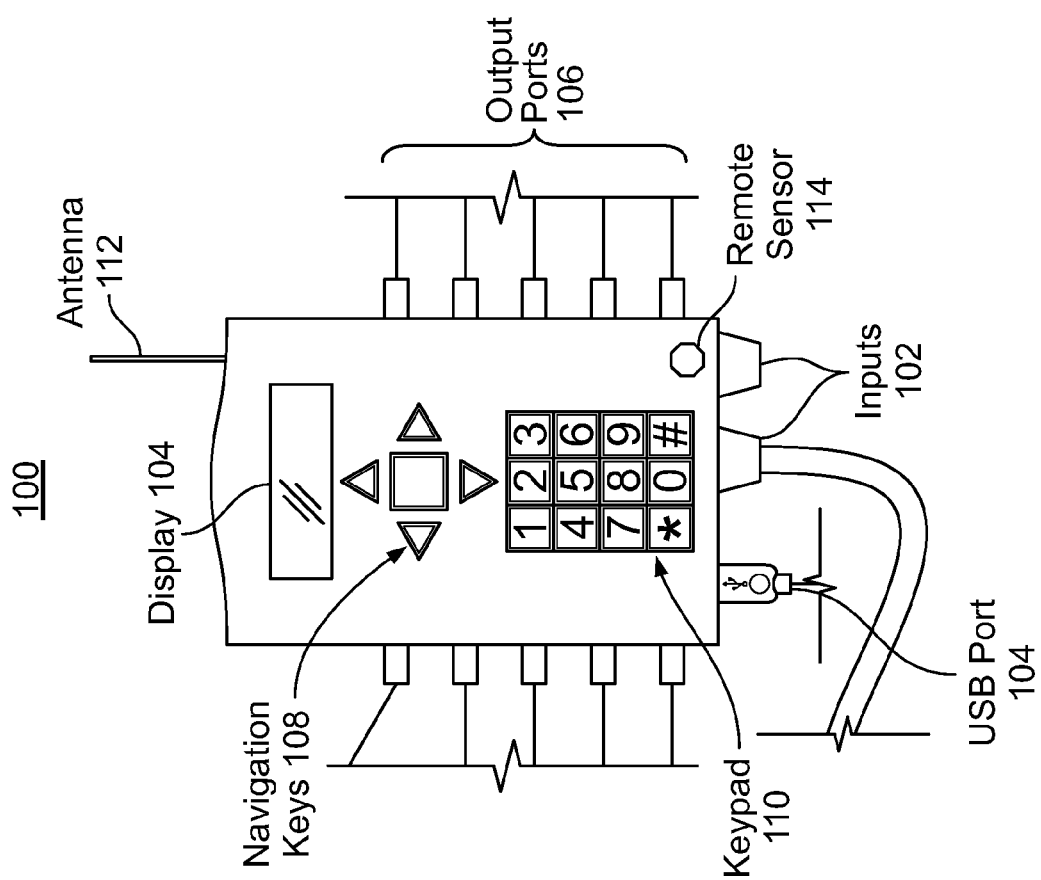
FIG. 1 is an elevational view of a communication signal distribution unit for controlling at least one incoming communication signal in accordance with the present invention.

With reference to FIG. 1, there is shown a communication signal distribution unit, generally designated 100, of the present invention. This communication signal distribution unit 100 is frequently referred to hereinafter as the "unit 100". Unit 100 preferably is suited to assist parents in censoring when and what children watch or how they electronically communicate with others such as while their parents are asleep or not home, particularly for multiple rooms and for multiple types of electronic devices.

The communication signal distribution unit 100 receives at least one incoming communication signal, such as at input connector 102. For example, typically more than one input port 102 may be provided to accommodate different types of incoming communication signals. For example, such multiple input ports may be configured to receive at least a conventional coaxial cable commonly used to provide a cable television signal, a digital subscriber line (DSL) cable commonly used to provide Internet service, and a conventional telephone line commonly used to provide landline telephone service. Additional communication signal inputs may be provided, if desired, for any other incoming communication signals.

An expansion USB port 104 provides connectivity for USB cables. For example, USB port 104 may be used for, a DSL filter for phone or for a WiFi connection. This USB port 104 may also be used for programming of the unit, such as from a separate computer or the like. Similarly, USB port 104 may be used for external control of unit 100 by a separate computer. The signal distribution unit 100 may include multiple USB ports, rather than the single port 104 as shown in FIG. 1. Additional ports may also be provided for expansion to Category 5 (Cat. 5) cable. Other types of inputs may be provided, as needed or as desired, for connectivity with future media connector types and formats.

Signal distribution unit 100 includes a display 104 which facilitates visible programming to selectively disconnect at least some of the multiple signal output ports 106 in a communication signal distribution system. Unit 100 may be programmed to disconnect or to disable selected output ports at selected increments of time. Thus, incoming TV analog and/or digital signals, phone signals and/or internet signals can be turned off at the incoming source, i.e., at unit 100. Thus, unit 100 can control multiple devices/rooms/wall ports, outlets, or the like at one time from a single communication signal distribution site with individually programmed on/off times for each output port.

Programming of unit 100 is facilitated by a plurality of function or navigation keys 108, which may include keys for navigating through options or information displayed on the display 104 in right, left, up or down directions. A center key (shown as square in FIG. 1) may be used for selecting a displayed option, programming step or the like. A keypad 110 may be utilized to enter numeric information, such as to enter a numerical password, to select one of the plurality of output ports 106, to enter the time that the selected output port is to be disabled, to enter the time that the selected output port is to be re-enabled, and the like. Thus, each distributed signal can be controlled separately with different variables. However, the unit may include more pushbuttons or controls, if desired, to provide more convenient programming of the unit.

In general, the communication signal distribution unit 100 includes a plurality of output signal distribution ports or terminals 106 to supply communication signals from a single site to TV, phone, internet, home computer media centers (either hardware or software based), or the like, to wall ports or outlets which may be located throughout the home or building. The communication signals may be delivered to the communications devices either by hardware or as a wireless signal, such as by an antenna 112 on the signal distribution unit 100.

Modems, including wireless, may first receive the communication signals from at least one of the output ports for distribution of the communication signals to some of the electronic devices. Such modems may work off different security codes for different devices. Unit 100 may also include internal amplifiers and/or other signal conditioning circuitry, as needed or desired. If desired, unit 100 may be incorporated or designed into other types of electronic controls, enclosures, boxes or the like.

The unit 100 may also include remote programming capability via (i) an IP protocol (i.e. the Internet/Ethernet), (ii) cell phone short message service (i.e. SMS, also know as "text message"), (iii) phone line dial-up with dual tone multi-frequency (DTMF) key prompt, (iv) infrared or short range wireless remote control (including but not limited to IrDA, Bluetooth, Zigbee, or WiFi), and any proprietary or non-proprietary short range wireless protocols.

The RF distribution unit may also included expanded scope to wide-area wireless (i.e. cellular or WiMax). For example, a parent who has a cellular family plan may go on a web-site and set controls on the times/places (via GPS) when another member on the family can place calls, or download internet content, or watch TV on their cellular handset or other electronic device.

A data processor, disposed in the unit, may have a memory backup battery or a memory card or chip for saving programmed parameters in case of an electrical power failure. For example, the unit may have an internal flash memory such that programmed parameters are not lost upon a power failure.

Unit 100 may be located where it is not normally seen, such as on a wall in a closet, in the basement, in a utility room, or in any other desired location. Of course, it may be preferable to locate unit 100 at or near to where TV, phone and/or internet cables enter the building. One unit 100 can typically control an entire communication network for a building, including outlets located throughout the building. The unit selectively controls timed access of communication signals to electronic devices which receive communication signals from an associated port 106.

Figure 2:
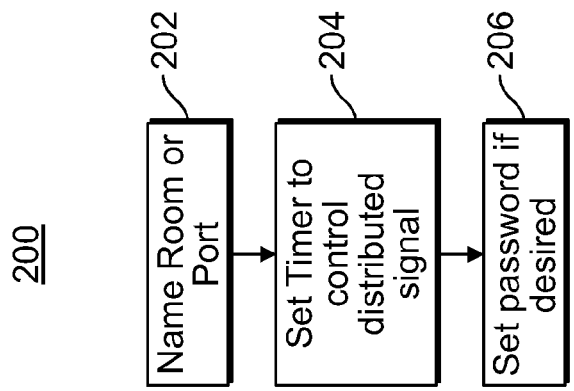
FIG. 2 is a flow diagram of exemplary steps which may be employed by the signal distribution unit shown in FIG. 1 to control distribution of television signals, computer/internet signals and telephone signals in accordance with another aspect of the present invention.

FIG. 2 illustrates a typical method, generally designated 200, for programming unit 100 to selectively control communication signal reception from one of the outlet ports 106. At step 202, the navigation keys 108 are used to select the desired port 106 to be programmed. At step 204, the keypad 110 is then used to set the time at which the selected port is to be disabled and the time at which the selected port it to be re-enabled. If desired, the password to access the programming of unit 100 may be set or reset, if desired, at step 206.

Figure 3:
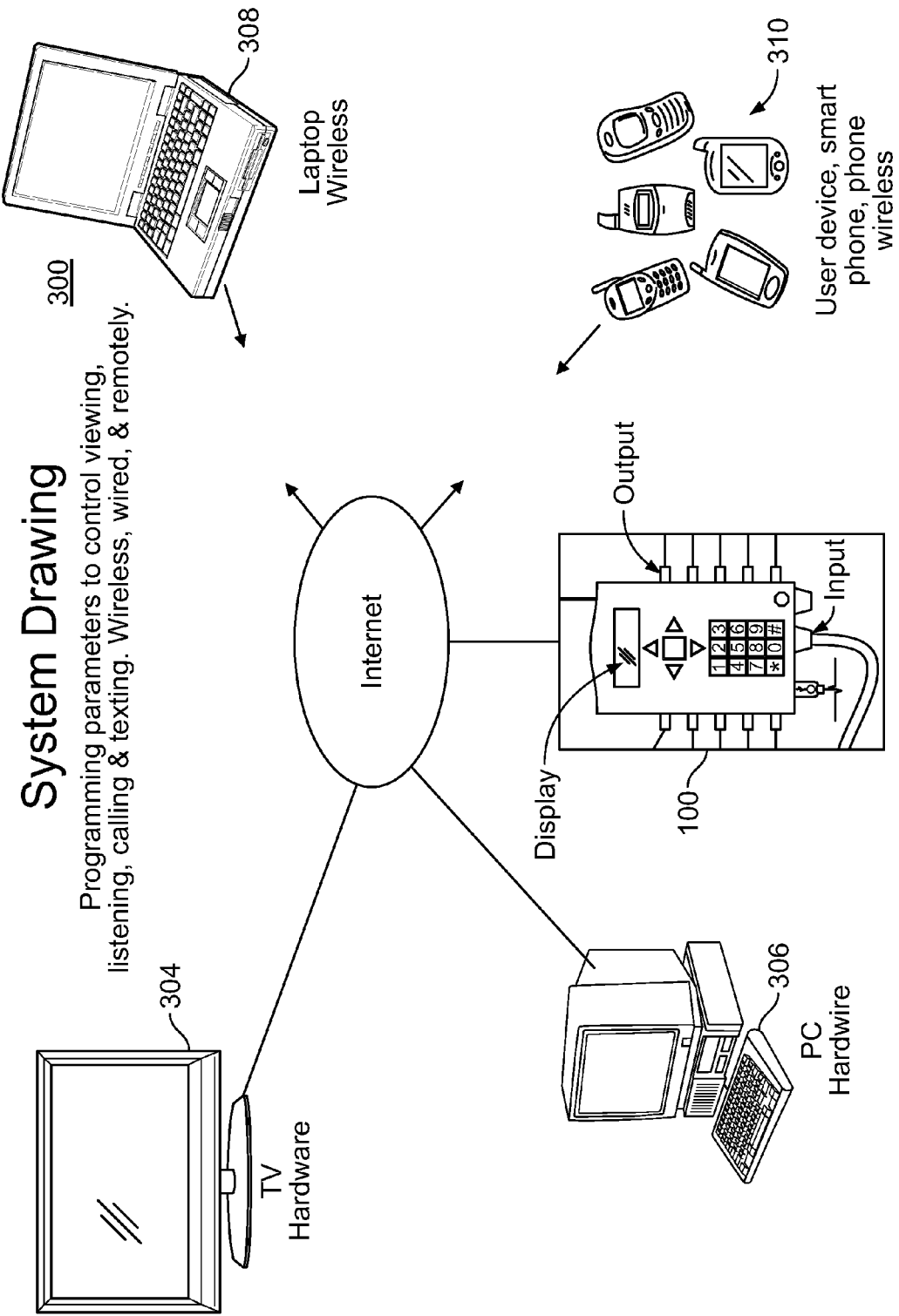
FIG. 3 is a diagrammatic view of a signal distribution system for controlling the communication signal to a plurality of exemplary electronic devices with the distribution unit of FIG. 1.

A typical system, generally designated 300, which the communication signal distribution unit 100 controls is shown in FIG. 3. For example, typical electronic devices to be access-controlled include televisions (TVs) 304, computers (including PC desk top 306, laptop 308, tablets, pads or the like), telephones 310 (including landline, cellular, smartphones or the like) and/or other electronic devices which receive communication signals. Of course, some of these communication signals may be at RF frequencies, such as TV signals; and other communication signals may be at lower frequencies, such as landline telephone signals. At least some of these electronic devices will receive Internet 302 signals from unit 100.

Figures 4, 5:
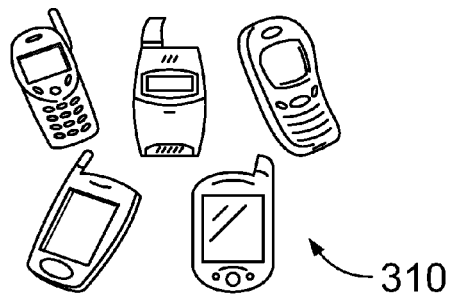
FIG. 4 is a chart, which may be generated by the distribution unit of FIG. 1, illustrating a telephone call record (similar records may be generated for TV and/or internet usage)
FIG. 5 is diagrammatic view of a 911 release lock for permitting 911 or other emergency telephone calls even if the corresponding telephone port of the distribution unit is currently programmed to block incoming telephone calls.

Unit 100 may further provide a status report, generally designated 400 in FIG. 4. The person administering unit 100 or system 300 can access or view a report of the users and the media being used. In the example shown in FIG. 4, the report 400 includes a date field 402, a time field 404, a user field 406, a call number field 408, a device ID field 410, and a duration field 412. Other types of fields could be added to the report 400, as desired. The screen size and line display of the report 400 can also be varied depending upon personal preferences. Preferably, the report 400 can also be remotely accessed over the Internet 302.

As shown in FIG. 5, unit 100 also includes a 911 release lock, generally designated 500, for the phones, by buffering and releasing, or just unlocking, the tone indicator. This will allow emergency calls to be made, such as to 911 and to parent, guardian, or the like, via landline phones or cell phones 310. That is, if the associated outlet port 106 is presently time-disabled, the release lock 500 will override the disabling of the associated port.

Figure 6:
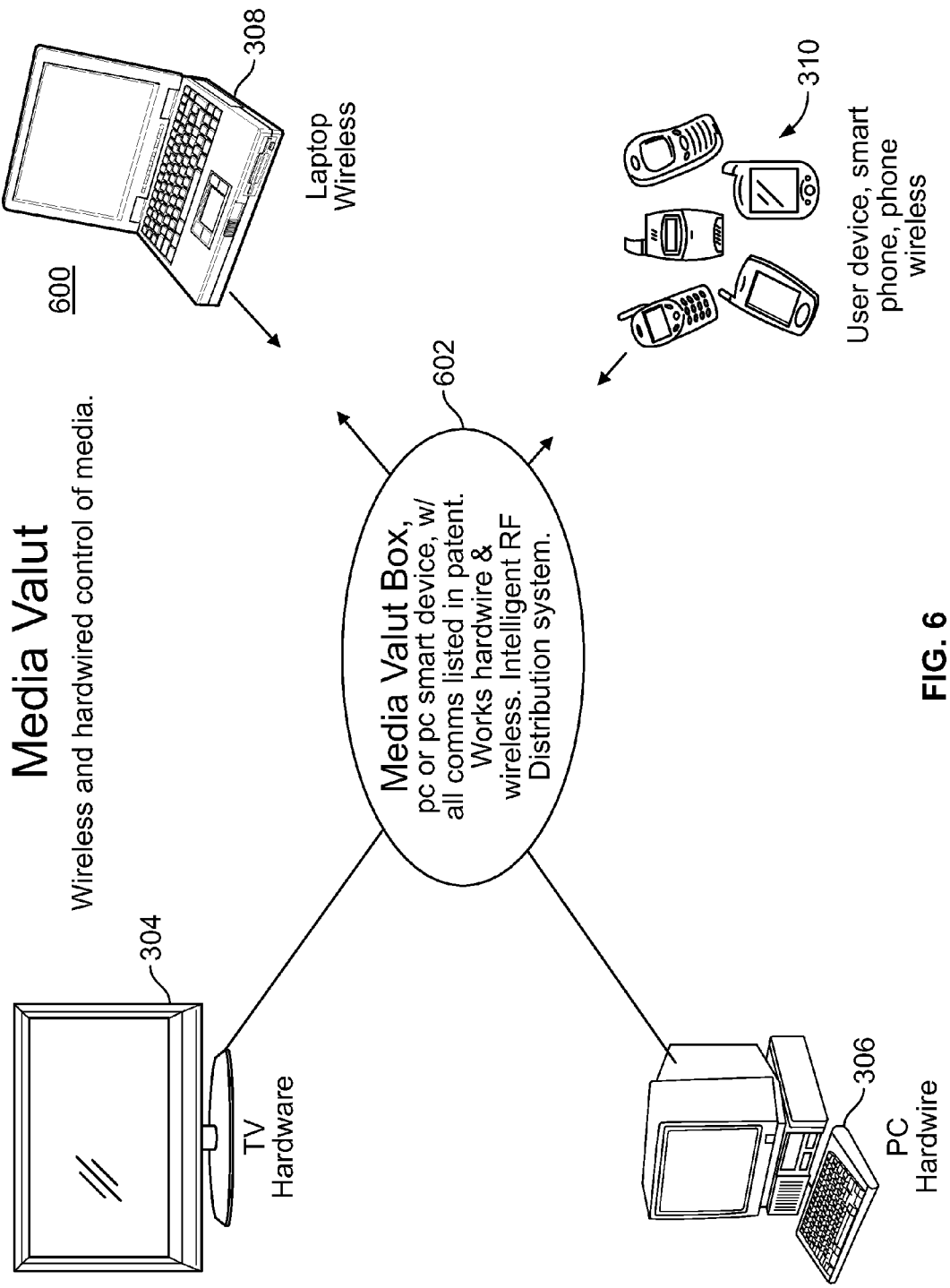
FIG. 6 is a diagrammatic view of a media vault for controlling distribution of communication signals to a plurality of exemplary electronic devices whether received via hardware or via wireless transmission.

The signal distribution unit 100 may also control or access a media vault or center, generally designated 600, in FIG. 6. Communication signal access to communication devices, such as the TV 304, the PC computer 306, the laptop computer 308 and/or hand-held electronic devices 310 from a media vault box 602 may be in accordance with 3G, 4G or future generation wireless protocols or by hardwire. The media center may be either hardware or software based and it may be accessible by laptop computer, hand-held electronic devices, or the like. The media center 600 may provide media via the internet, or the media may be consumer owned and resident at the home, such as resident in the media vault box 602 or otherwise accessible by the media vault box.

It may now be appreciated that the communication signal distribution unit 100 provides a number of advantages in controlling access to incoming communication signals to various types of electronic devices. For example, some of these features and advantages include:

1. One password to control the distribution of communication signals.
2. No child interaction needed or required, such as to access an emergency telephone number.
3. Communication signal control in a whole house, dormitory, school, military building, hotel, apartment, hospital or any other building or any area where distributed communication signal control is desired.
4. A processor with a clock for controlling signal distribution.
5. The display, keypad, buttons, USB ports, and/or wireless may be used for programming the signal distribution, entering a password if desired, and provide an option to track changes. Programming may also used to control distribution of signals to room or wall port names.
6. Each port can be managed separately. Different rules may be utilized for each port if so desired. That is, one unit may have many rules.
7. Phone jacks—same controls for rooms or numbers allowed. However, 911, parent numbers and emergency numbers are always enabled. All other telephone numbers may be blocked.
8. Internet connectivity may be blocked during off hours unless an emergency code is entered. Internet activity is preferably tracked and/or monitored, and usage during off hours may set off an alarm if an emergency code is not entered.

While particular embodiments of the invention have been shown and described, it will be obvious to those skilled in the art that changes and modifications may be made therein without departing from the invention in its broader aspects.

The invention claimed is:

1. A communication signal distribution unit comprising:
   a plurality of input ports for receiving a plurality of incoming communication signals, with each of the plurality of input ports receiving one of the plurality of incoming communication signals;
   the plurality of input ports configured to receive a coaxial cable to provide a cable television signal, a digital cable to provide Internet service, and a telephone line to provide landline telephone service;
   a plurality of output ports, each of the plurality of output ports for providing a communication signal to an electronic device;
   the plurality of output ports configured to receive a coaxial cable to provide a cable television signal, a digital cable to provide Internet service, and a telephone line to provide landline telephone service;
   a display for viewing information; and
   a set of keys for selecting one of the output ports, for entering a time to disable the communication signal provided at the selected output port, and for entering a time to re-enable provision of the communication signal at the selected output port.

2. The communication signal distribution unit of claim 1, further comprising:
   an antenna to provide a wireless communication signal to at least one electronic device.

3. The communication signal distribution unit of claim 1, said electronic devices including televisions, computers and telephones.

4. The communication signal distribution unit of claim 1, the set of keys including a set of navigation keys and a numerical keypad.

5. The communication signal distribution unit of claim 1, further comprising:
   a release lock to enable a telephone call to a 911 number or to another emergency number.

6. The communication signal distribution unit of claim 1, further comprising:
   means for generating a status report for usage of a selected one of the plurality of output ports.

7. The communication signal distribution unit of claim 1, further comprising:
   a remote sensor for receiving programming signals from a remote control.

8. The communication signal distribution unit of claim 1, further comprising:

a USB port for providing connectivity of a computer to the communication signal distribution unit.

* * * * *